No. 630,959. Patented Aug. 15, 1899.
J. WILSON.
FILTERING DEVICE.
(Application filed May 12, 1898.)
(No Model.)
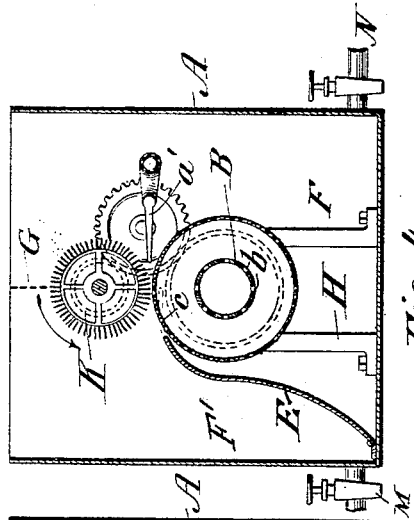
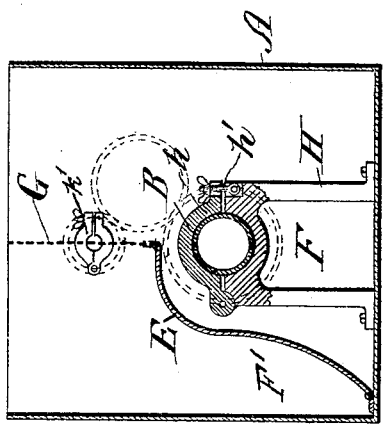
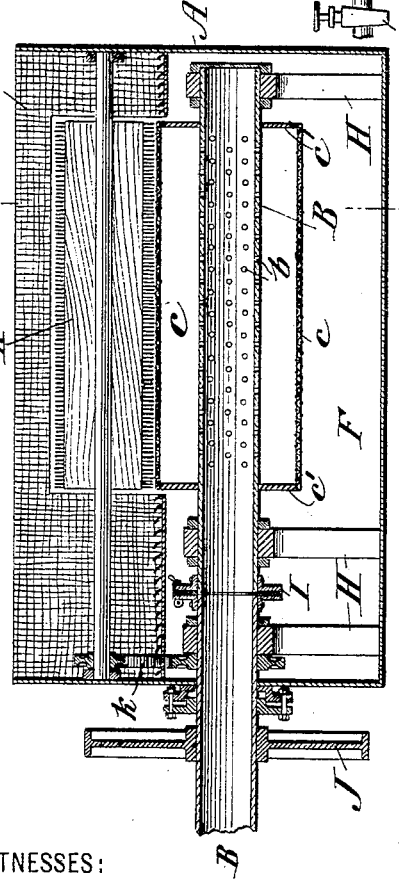
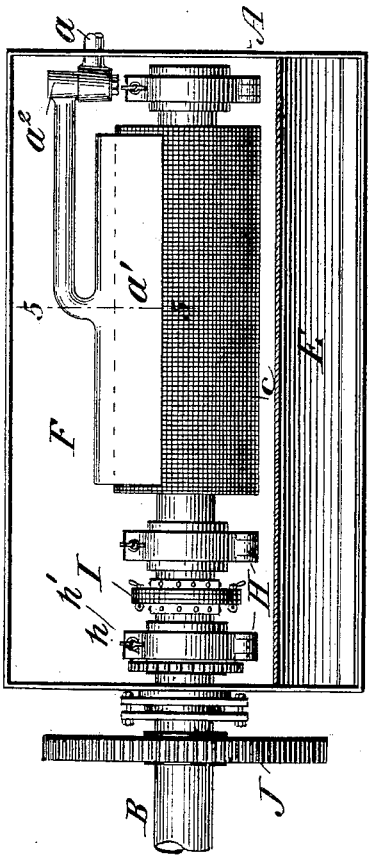
WITNESSES:
D. N. Hayward
Geo. E. Crouse.
INVENTOR
John Wilson
BY Edwin H. Brown
HIS ATTORNEY

UNITED STATES PATENT OFFICE.

JOHN WILSON, OF NEW YORK, N. Y.

FILTERING DEVICE.

SPECIFICATION forming part of Letters Patent No. 630,959, dated August 15, 1899.

Application filed May 12, 1898. Serial No. 680,437. (No model.)

*To all whom it may concern:*

Be it known that I, JOHN WILSON, a citizen of the United States, residing in the city of New York, (Brooklyn,) county of Kings, and State of New York, have invented a certain new and useful Improvement in Filtering Devices, of which the following is a specification.

My invention relates to filtering devices.

I will describe a device embodying my invention and then point out the novel features in the claims.

In the drawings, Figure 1 is a vertical longitudinal sectional view of a filtering device. Fig. 2 is a top view thereof, partly in horizontal section, the brush being removed. Fig. 3 is a vertical transverse sectional view taken on the line 3 3 of Fig. 1. Fig. 4 is a detail sectional view. Fig. 5 is an enlarged detail sectional view taken on the line 5 5 of Fig. 2.

A represents a suitable tank or receptacle through which water or other liquid to be filtered passes. Water enters the tank through a pipe $a$ and escapes through a spraying device $a'$ onto a filtering-cylinder C and after being filtered passes out through a pipe B. The spraying device is preferably of a form in cross-section similar to that shown in Fig. 5, and it may be of a length equal to the filtering-cylinder. It is arranged to discharge onto the cylinder, so that sediment, impurities, &c., in the liquid will be caught by the surface of the cylinder and washed therefrom by the incoming water into a compartment F', formed by a hinged partition E, while the filtered water escapes through the cylinder into the compartment F. The free edge of the partition is adjacent the spraying device and it is cut to fit around the cylinder. Canvas G or other similar material is connected with the free edge and extends to the top of the tank or receptacle.

The filtering-cylinder C in the present instance comprises a screen-body $c$, carried by ends $c'$, which are fast upon pipe B. The filtered water escapes through this pipe, this being permitted by perforations $b$ in that part of the pipe inclosed by the ends $c'$. The pipe B may be journaled in suitable standards H in the tank or receptacle, and each standard is provided with a hinged cap $h$ to permit the pipe being removed when it is necessary to renew or change the cylinder. This is permitted by reason of the pipe being formed in sections, the adjacent ends of the sections being united by a detachable coupling I. $h'$ represents catches for holding the free end of the hinged caps $h$.

During the filtering process it is preferable to rotate the cylinder B in order to continually present a new surface, and thus prevent clogging of the screen. This may be accomplished by providing a gear or pulley J on the pipe B, which may be operated in any desired manner. To assist in keeping the cylinder free from sediment, I provide a brush K, driven by intermediate gearing $k$ from the pipe B, preferably in a direction indicated by the arrow, Fig. 3, and the brush is kept clean by the incoming water. The brush is preferably journaled in bearings which have a hinged cap $k'$, so that it can be easily removed when it is desired to remove the cylinder B. The spraying device is also connected with pipe $a$ in such a manner that it can be raised out of the way when the cylinder C is removed. This may be accomplished by connecting the spraying device with a plug $a^2$, which when the spraying device is raised shuts off the supply of water.

M and N represent draw-off cocks for the compartments on either side of the partition when the device is to be flushed.

The operation of my device, briefly stated, is as follows: The water or other fluid is sprayed onto and over the cylinder which catches the impurities contained therein, while the filtered water passes through the screen into the compartments F and then out of the tank through the pipe B. During the filtering process the cylinder is revolved and with it the brush. The brush loosens the sediment on the screen, so that the incoming water can wash the sediment from the screen and any that may be caught by the brush.

I claim as my invention—

1. A filtering device comprising a suitable tank or receptacle, a partition therein forming two compartments within the tank, a rotary filtering-cylinder located in one of said compartments, a brush rotating above said cylinder for keeping the said cylinder clean, and a spraying device, substantially as described.

2. A filtering device comprising a suitable tank or receptacle, a hinged partition therein forming two compartments within the tank, a rotary filtering-cylinder located in one of said compartments, a rotary brush above said cylinder for brushing the matter caught by said cylinder into the other of said compartments, and a spraying device, substantially as described.

3. A filtering device comprising a suitable tank or receptacle having an outlet-pipe, a removable rotary filtering-cylinder located therein, a pipe carrying said cylinder and detachably coupled to said outlet-pipe, and a removable rotary brush above said cylinder, substantially as described.

4. A filtering device comprising a suitable tank or receptacle having a suitable outlet, a removable filtering-cylinder located therein, and a hinged spraying device for said cylinder, substantially as shown and described.

In testimony whereof I have signed my name to this specification in the presence of two subscribing witnesses.

JOHN WILSON.

Witnesses:
W. LAIRD GOLDSBOROUGH,
GEO. E. CRUSE.